(12) United States Patent
Tornatore

(10) Patent No.: US 6,341,537 B1
(45) Date of Patent: Jan. 29, 2002

(54) CONTROL DEVICE FOR A GEAR CHANGE OF A VEHICLE

(75) Inventor: Giovanni Tornatore, S. Benigno Canavese (IT)

(73) Assignee: Magneti Marelli S.p.A., Milan (IT)

(*) Notice: Subject to any disclaimer, the term of this patent is extended or adjusted under 35 U.S.C. 154(b) by 0 days.

(21) Appl. No.: 09/608,376

(22) Filed: Jun. 30, 2000

(30) Foreign Application Priority Data

Jun. 30, 1999 (IT) .......................... TO99A0558

(51) Int. Cl.$^7$ .................................. B60K 20/00
(52) U.S. Cl. .................... 74/337.5; 74/473.21
(58) Field of Search .................. 74/473.21, 473.1, 74/473.11, 473.12, 473.24, 473.25, 473.27, 473.32, 473.33, 337.5, 485, 497

(56) References Cited

U.S. PATENT DOCUMENTS

| | | | |
|---|---|---|---|
| 2,577,019 A | * 12/1951 | Kesterton | 74/473.21 |
| 2,929,260 A | * 3/1960 | Hodkin | 74/473.21 |
| 3,421,384 A | * 1/1969 | Okamota et al. | 74/473.21 |
| 3,461,739 A | * 8/1969 | Viegas | 74/337.5 X |
| 3,880,015 A | * 4/1975 | Kranzler et al. | 74/337.5 |
| 3,954,021 A | * 5/1976 | Mraz | 74/337.5 X |
| 5,150,629 A | 9/1992 | Morris et al. | |
| 5,809,836 A | * 9/1998 | Patzold et al. | 74/337.5 |
| 5,988,009 A | * 11/1999 | Tornatore et al. | 74/473.27 |
| 6,122,983 A | * 9/2000 | Hoffman | 74/337.5 |

FOREIGN PATENT DOCUMENTS

| | | |
|---|---|---|
| DE | 196 10 104 A1 | 9/1997 |
| EP | 0 849 508 A1 | 6/1998 |
| EP | 1065415 A | * 1/2001 |

* cited by examiner

*Primary Examiner*—Thomas R. Hannon
*Assistant Examiner*—Colby Hansen
(74) *Attorney, Agent, or Firm*—Merchant & Gould P.C.

(57) ABSTRACT

A control device for a gear change of a vehicle comprising a support structure, a control member borne by the support structure such that it can move in translation along a first axis and rotate about this axis in order to carry out a maneuver to select the row of gears and a maneuver to engage or disengage these gears, an actuator cooperating with the control member in order to rotate it about the first axis and dispose it, for each row of gears, in a neutral position and two engagement positions of respective gears, and a cam and tappet unit interposed between the support structure and the control member which can be selectively actuated in order axially to displace the control member by a predetermined amount during the actuation of the actuator; the cam and tappet unit comprises a tappet member borne by the support structure and a guide member rigid with the control member and provided with a series of cams parallel to one another and each adapted to be selectively engaged by the tappet member in order to guide the displacement of the control member between adjacent engagement positions of adjacent rows during the actuation of the actuator.

15 Claims, 2 Drawing Sheets

CONTROL DEVICE FOR A GEAR CHANGE OF A VEHICLE

BACKGROUND OF THE INVENTION

Devices of the above-mentioned type are known and essentially comprise a control member adapted to assume four different positions along its first axis, each of which corresponds to the selection of a gear, and to assume three different angular positions contained in planes at right angles to this first axis, each of which corresponds to the engagement of a gear or the neutral position. This control member is moved into these positions under the action of appropriate actuators: normally, a first multi-position actuator is used to control the displacements along the first axis, while a second actuator, also multi-position and moving along a second axis at right angles to this first axis, is used to control the angular displacements about this first axis.

The above-mentioned actuators are normally actuated by pneumatic, hydraulic or electrical methods and are controlled by relative actuation means; in the case of hydraulic actuation, each actuator is in particular driven by a plurality of suitably combined electrovalves.

This means that the above-mentioned control member requires, for its actuation, the use of various relatively complex hydraulic components, for instance multi-position actuators, valves, stroke regulation members and position transducers which require high-precision mechanical processing and give rise to constructional arrangements that are of high cost.

In order to remedy these drawbacks, gear change control devices are also known from Italian Patent Application TO96A001035 in the name of the applicants which make it possible to carry out both the selection of the rows of gears and the engagement or disengagement of the gears themselves using a single multi-position hydraulic actuator of conventional type.

These devices substantially comprise a control member moving axially to carry out a maneuver to select the row of gears and rotating about its axis, under the thrust of an output member of the above-mentioned multi-position actuator, to carry out a maneuver to engage or disengage the gears themselves. In particular, the control member selectively actuates, during its displacements, a plurality of gear engagement members and is mounted coaxially and in a moving manner in a cylindrical drum, which may be made selectively rigid with a fixed support unit of the gear change control device in a plurality of angular positions corresponding to respective gear selection rows.

An engagement member coupled within a cam defined by a groove obtained on the lateral wall of the drum and formed as a broken line is also fixed on the control member. This cam comprises a plurality of rectilinear axial stop sections of the control member, whose number is equal to the rows of gears, disposed at different axial heights and angularly offset from one another, and a plurality of oblique sections connecting the stop sections.

In order to move from one gear to the next within the same row, the drum is kept angularly mobile with respect to the support unit and rotates rigidly with the control member actuated by the actuation of the actuator. In order to move, however, from a gear of a particular row to a successive gear of an adjacent row, the drum is made rigid with the support unit and the actuation of the actuator therefore causes the engagement member to slide within the cam which, by means of one of its oblique sections, guides the control member, displacing it both axially and angularly.

The above-mentioned gear change control device, although it is actuated by a single hydraulic actuator, thereby simplifying the hydraulic actuation circuit, has the drawback that it needs, for correct operation, to be associated with a gear change of high precision, i.e. whose components have small dimensional tolerances and whose internal operating clearances are limited, thereby increasing the costs involved.

Since the control member has a single guide cam, the operating clearances normally present in the gear change at each maneuver to engage and disengage the gears tend to be added together causing a phase difference between the positions occupied by the engagement member along the cam and the corresponding positions of interaction between the control member and the gear engagement members, leading to imprecise actuation of these engagement members.

SUMMARY OF THE INVENTION

The object of the present invention is to provide a control device for a gear change of a vehicle, which is free from the drawbacks associated with the control devices of known type as described above.

This object is achieved by the present invention which relates to a control device for a gear change of a vehicle comprising:

a support structure, a control member borne by the support structure such that it can move in translation along a first axis and rotate about this axis in order to carry out a maneuver to select the row of gears and a maneuver to engage or disengage the gears themselves, actuator means cooperating with the control member which can be selectively actuated in order to displace this control member according to a predetermined movement selected from two possible movements, respectively in rotation and in translation, and dispose it, for each row of gears, in a neutral position and two engagement positions of respective gears, cam and tappet means interposed between the support structure and the control member which can be selectively actuated in order to associate components of movement in rotation and in translation of the control member during the actuation of the actuator means, characterized in that the cam and tappet means comprise a tappet member borne by the control member or the support structure and a guide member rigid with the other of the control member and the support structure and provided with a series of cams parallel to one another and each adapted to be selectively engaged by the tappet member in order to guide the displacement of the control member between adjacent engagement positions of adjacent rows during the actuation of the actuator means.

BRIEF DESCRIPTION OF THE DRAWINGS

The present invention is described in further detail below with reference to a preferred embodiment thereof, given purely by way of non-limiting example, made with reference to the accompanying drawings, in which.

DETAILED DESCRIPTION OF THE INVENTION

Figure 1:
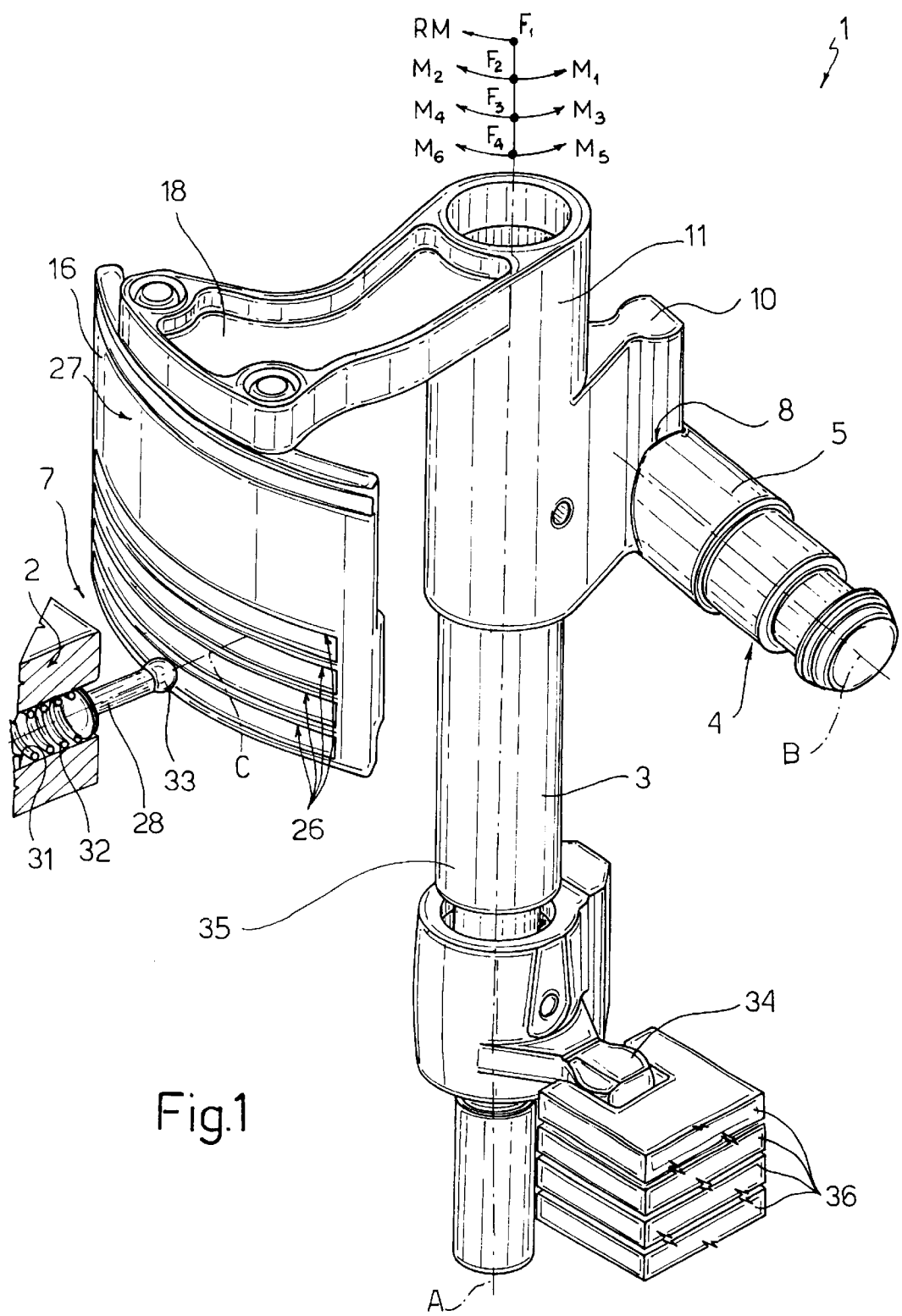
FIGS. 1 and 2 show, in relative perspective views from different directions and with some parts removed for clarity, a control device for a gear change of a vehicle of the present invention.
Figure 2:
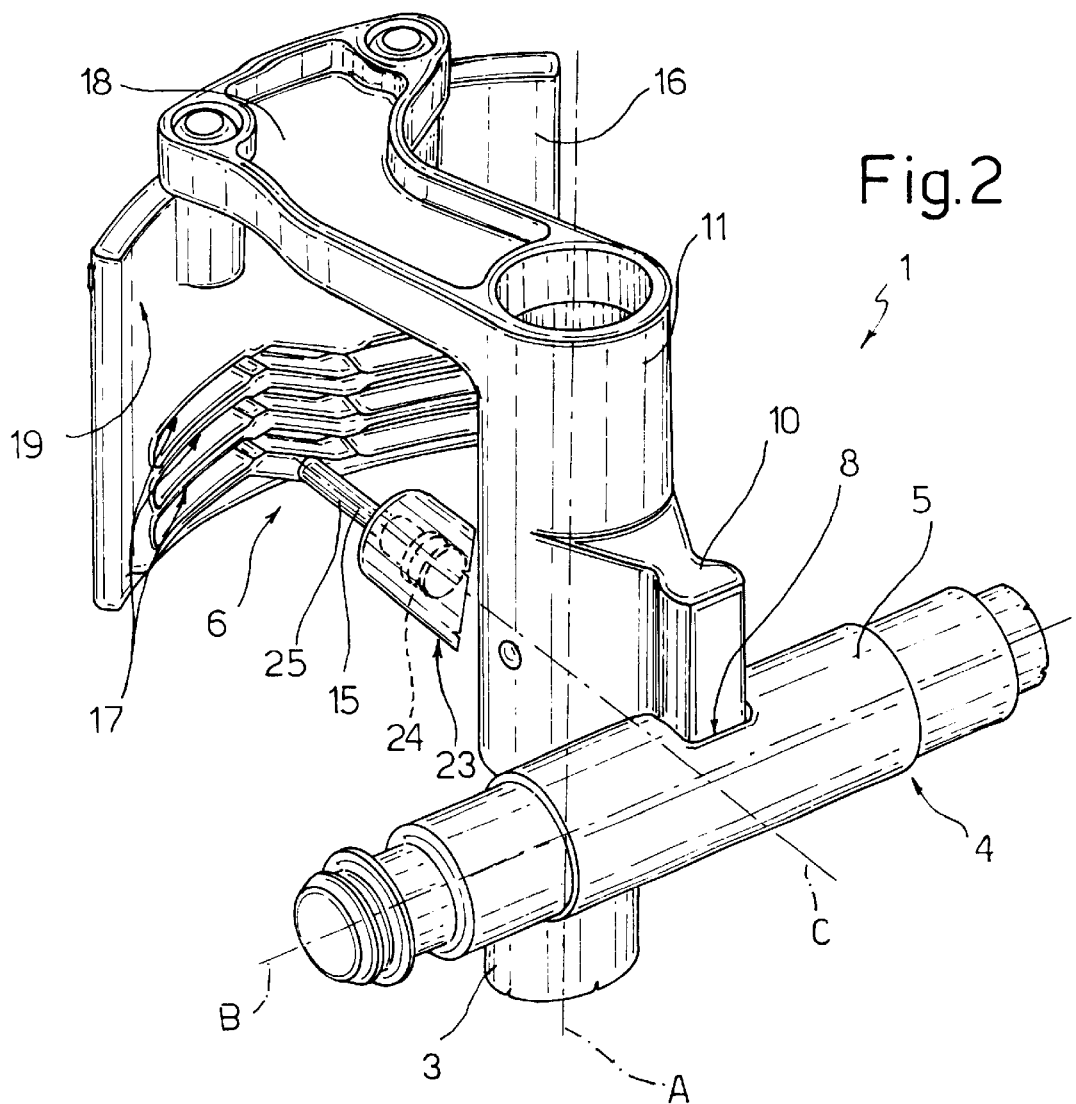

In FIGS. 1 and 2, a control device for an automatic gear change (not shown) of a vehicle (not shown) is shown overall by 1.

The device 1 substantially comprises a fixed support structure 2, only part of which is shown, and a control shaft 3 having a longitudinal axis A and mounted in a manner which is not shown on the support structure 2, with respect to which it can move axially and can rotate angularly about this axis A.

The control shaft 3 can in particular move along the axis A to carry out a maneuver to select the row of gears and can rotate about the axis A to carry out a maneuver to engage or disengage the gear selected. More precisely, for each axial position for selection of the row of gears, the control shaft 3 is adapted to occupy an intermediate angular neutral position and two opposite lateral angular positions for the engagement of respective gears, equally angularly spaced from the above-mentioned neutral position.

By way of example, FIG. 1 shows a simplified diagram of the engagement and selection positions occupied by the control shaft 3; in this diagram, the central neutral positions of the rows that can be selected by the movement in translation of the control shaft 3 are shown by the letters F1, F2, F3, F4, and the lateral positions of engagement obtained by the movement of angular rotation of the control shaft 3 about the axis A are shown by M1, M2, M3, M4, M5, M6, RM.

The device 1 further comprises an actuator 4, preferably with hydraulic control 4 (of known type and shown only partially in the accompanying drawings), having an output member 5 moving along an axis B at right angles to the axis A and cooperating with the control shaft 3 in order to rotate it about the axis A and dispose it, within each row, in the above-mentioned neutral and engagement positions. The device 1 lastly comprises a cam and tappet unit 6 (FIG. 2) interposed between the support structure 2 and the control shaft 3 which can be selectively actuated in order to cause an axial displacement of a predetermined amount of the control shaft 3 during the rotation of this latter about the axis A, and a locking unit 7 that can be released (FIG. 1) in order to stabilize the axial positions of selection of the row of gears occupied by the control shaft 3.

The output member 5 of the actuator 4 has a substantially cylindrical configuration of axis B and is provided with a through lateral cavity 8 which has, in cross-section at right angles to the axis A, a C-shaped profile and is engaged in a sliding manner in a direction parallel to the axis A by an end portion of complementary profile of a tooth 10 projecting radially from an end portion 11 of the control shaft 3. The output member 5 of the actuator 4 is adapted to occupy two axial end-of-stroke positions corresponding to the engagement positions of the control shaft 3, and an axial median position corresponding to the neutral position of the control shaft 3.

With reference to FIG. 2, the cam and tappet unit 6 comprises a tappet member 15 borne by the support structure 2 such that it can slide axially along its axis C at right angles to the axes A and B, and a curved guide member 16 of axis A rigidly connected to the control shaft 3 and provided with a plurality of parallel cams 17 stacked on one another in a direction parallel to the axis A and each adapted to be selectively engaged by the tappet member 15 in order to guide the displacement of the control shaft 3 between adjacent engagement positions of adjacent rows during the axial translation of the output member 5 of the actuator 4.

The guide member 16 is in particular formed by a curved wall of axis A having the shape of a portion of a cylindrical jacket, faces the end portion 11 of the control shaft 3 and is secured in a projecting manner to a free end of an arm 18 extending radially outwards from an end of the control shaft 3 in a position adjacent to the tooth 10 and on the side diametrically opposite to this tooth 10.

In the embodiment illustrated, there are three cams 17 formed by relative shaped grooves obtained on a front surface 19 of the guide member 16 facing the end portion 11 of the control shaft 3. These cams 17 have identical profiles, are disposed adjacent to one another and are angularly aligned with one another with respect to the axis A.

Figure 3:
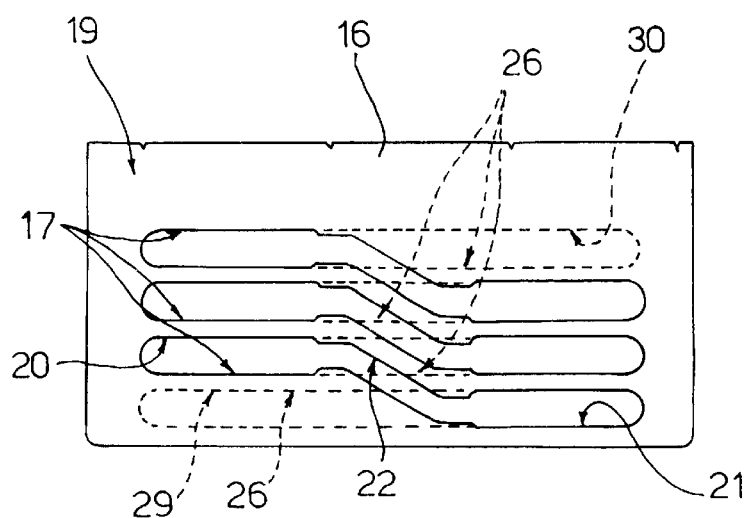
FIG. 3 is a front view, on an enlarged scale, of a detail of the device of FIGS. 1 and 2.

With particular reference to FIG. 3, each cam 17 is substantially shaped as a broken line and comprises two rectilinear end angular sections 20, 21 adapted to act as an axial stop for the control shaft 3, associated with adjacent engagement positions of adjacent rows, and extending over respective planes at right angles to the axis A spaced from one another by a predetermined amount D that depends on the distance between adjacent rows of gears. Each cam 17 further comprises an intermediate angular section 22 oblique with respect to the axis A, connected on either side to the respective end sections 20, 21 and shaped such as to cause, when engaged by the tappet member 15, an axial displacement of the control shaft 3 by the amount D in association with a predetermined angular displacement of this control shaft 3. Similar portions of adjacent cams 17 are also spaced from one another in a direction parallel to the control shaft 3 by the amount D.

The tappet member 15 is formed by a cylindrical pin of axis C defining the output member of a single-effect actuator 23 which may be electrically, pneumatically or hydraulically controlled. The tappet member 15 is normally held in a known manner by a cylindrical helical spring 24 of axis C in a rest position, in which it is separated from the guide member 16, and can be selectively disposed in an actuation position, in which its end portion 25 engages a relative cam 17.

With reference to FIG. 1, the locking unit 7 comprises a plurality of rectilinear grooves 26 parallel to one another, whose number is equal to the number of rows of gears, i.e. four in the embodiment shown, obtained on a rear surface 27 of the guide member 16 opposite the front surface 19 and spaced from one another in a direction parallel to the axis A by the amount D, and a stop member 28 extending from the opposite side of the guide member 16 with respect to the tappet member 15 and adapted selectively to engage in a releasable way one of the grooves 26 in order to define a respective axial position of selection of the row of gears of the control shaft 3.

In particular, the grooves 26 have the same axial extension as the cams 17 and are angularly aligned with these cams 17. Each groove 26 is also aligned along a plane at right angles to the axis A with at least one end section 20, 21 of a relative cam 17. In further detail, the end grooves 26 are aligned along relative planes at right angles to the axis A respectively with the end section 20 of an end cam 17 and with the end section 21 of the opposite end cam 17. Each of the two intermediate grooves 26 has, however, opposite end portions 29, 30 aligned along a relative plane at right angles to the axis A with end sections 20, 21 of adjacent cams 17 corresponding to gears of the same row.

The stop member 28 extends coaxially to the tappet member 15, is mounted in an axial sliding manner in a hole 31 of the support structure 2 and is axially forced by a cylindrical helical spring 32 of axis C towards a locking position, in which it has its spherical end head 33 disposed in engagement with one of the grooves 26. It will be appreciated that the rigidity of the spring 32 is such as to allow the disengagement of the stop member 28 from the relative groove 26 and its passage to an adjacent groove 26 during the axial displacement of the output member 5 of the actuator 4 in the case in which the tappet member 15 is disposed in the actuation position, i.e. in engagement with one of the cams 17.

With reference to FIG. 1, the control shaft 3 lastly comprises a lug 34 of flat configuration projecting radially outwards from an intermediate portion 35 of the control shaft 3 and selectively engaging relative engagement members 36 of the gears of the gear change, four of which are shown in the embodiment, shaped as forks, disposed adjacent to one another, lying in parallel planes at right angles to the axis A and aligned with one another in a direction parallel to the axis A in correspondence with the neutral positions F1, F2, F3 and F4 of the control shaft 3.

In operation, in order to move from one gear to the next within the same row, for instance to move from the gear M1 to the gear M2, it is necessary to de-actuate the actuator 23 such that the tappet member 15 is disposed under the action of the spring 24 in the rest position and to control the axial translation of the output member 5 of the actuator 4 from the end-of-stroke position corresponding to the gear currently engaged, in this case M1, to the opposite end-of-stroke position corresponding to the gear to be engaged, in this case M2.

The translation of the output member 5 along the axis B, as a result of the engagement of the tooth 10 in the cavity 8, causes a rotation of the control shaft 3 about the axis A guided by the engagement of the stop member 28 in the groove 26 corresponding to the row of gears selected. At the same time, the lug 34 rotates with the control shaft 3 about the axis A and causes the lateral displacement of the engagement member 36 with which it is disposed in engagement.

To return to the previous gear, the output member 5 simply has to be moved in axial translation in the opposite direction.

To move from a gear of a specific row, for instance from the gear M2, to a subsequent gear of an adjacent row, for instance M3, it is necessary to displace the tappet member 15 into the actuation position, in which it engages the cam 17 facing it and, subsequently, to control the axial translation of the output member 5 of the actuator 4 from the end-of-stroke position corresponding to the gear currently engaged, in this case M2, to the opposite end-of-stroke position corresponding to the gear to be engaged, in this case M3.

During the subsequent rotation of the control shaft 3 about the axis A, the tappet member 15 travels the intermediate oblique section 22 of the cam 17 engaged thereby at the same time causing the axial translation of the control shaft 3 by the amount D.

The thrust in the direction parallel to the axis A exerted on the guide member 16 by the interaction between the tappet member 15 and the intermediate section 22 of the cam 17 engaged thereby overcomes the locking reaction exerted on the guide member 16 deriving from the cooperation between the stop member 28 and the relative groove 26 and depending on the rigidity of the spring 32. Consequently, the stop member 28 is disengaged from the groove 26 corresponding to the row of the gear M2 and snaps into engagement in the adjacent groove 26 corresponding to the row of the gear M3.

At the same time, the lug 34 moves in rotation and translation with the control shaft 3 initially causing the lateral displacement of the engagement member 26 associated with the row of the gear M2 and, subsequently, after having come into engagement with the adjacent engagement member 36 corresponding to the row of the gear M3, the lateral displacement of the latter in the same direction.

In order to return to the previous gear, i.e. in this case from the gear M3 to the gear M2, it is simply necessary to move the output member 5 of the actuator 4 in axial translation in the opposite direction, maintaining the tappet member 15 in the actuation position.

The operations described above are managed automatically by an electronic control unit of the gear change (known and not shown) mounted on the vehicle.

The advantages that the device 1 of the invention offers are evident from an examination of its characteristic features.

In particular, the device as described is simple and economic to produce as it enables control of both the selection of the rows of gears and of the engagement or disengagement of -these gears by means of a single multi-position actuator of conventional type, such as the actuator 4, thereby simplifying the actuation circuit.

Moreover, as a result of the presence of a plurality of parallel cams 17 each dedicated to the passage between two adjacent gears of adjacent rows, any operating clearances normally present in the gear change have a limited impact on each cam 17, thereby minimising the operating inaccuracies of the engagement members 36. In other words, the use of a plurality of parallel and angularly aligned cams 17 makes it possible, with respect to the neutral positions of the control shaft 3, to dispose the engagement members 36 aligned with one another with respect to a common reference direction parallel to the axis A; consequently, with each change of row of gears, i.e. with each passage from one cam 17 to the adjacent cam, any operating inaccuracies due to the internal clearances of the gear change are cancelled out during the passage from one engagement member 36 to the adjacent member.

Lastly, the device 1 is extremely compact and of reduced size.

It will be appreciated that modifications and variations that do not depart from the scope of protection defined by the claims may be made to the device 1.

In particular, the gear selection maneuver could take place by rotation of the control shaft 3 about the axis A, while the gear engagement/disengagement maneuver could be made by axial translation of the control shaft 3.

Moreover, the gear selection rows could be spaced from another along the axis a by different amounts.

What is claimed is:

1. A control device (1) for a gear change of a vehicle comprising:
   a support structure (2),
   a control member (3) borne by the support structure (2) such that it can move in translation along a first axis (A) and rotate about this axis in order to carry out a maneuver to select the row of gears and a maneuver to engage or disengage these gears,
   actuator means (4) cooperating with the control member (3) which can be selectively actuated in order to displace the control member (3) according to a predetermined movement selected from two possible movements, respectively in rotation and in translation, and dispose it, for each row of gears, in a neutral position and two engagement positions of respective gears, cam and tappet means (6) interposed between the support structure (2) and the control member (3) which can be selectively actuated in order to associate components of movement in rotation and in translation of the control member (3) during the actuation of the actuator means (4), characterized in that the cam and tappet means (6) comprise a tappet member (15) borne by the control member (3) or the support structure (2) and a guide member (16) rigid with the other of the control member (3) and the support structure (2) and provided with a series of cams (17) parallel with one another and each adapted to be selectively engaged by the tappet member (15) in order to guide the displacement of the control member (3) between adjacent engagement positions of adjacent rows during the actuation of the actuator means (4).

2. A device as claimed in claim 1, characterized in that it comprises stabilization means (7) for respective positions of selection of the row of gears occupied by the control member (3) during the selection maneuver.

3. A device as claimed in claim 2, characterized in that the stabilization means comprise locking means (7) that can be released interposed between the guide member (16) and the support structure (2).

4. A device as claimed in claim 3, characterized in that the locking means (7) comprise:

a plurality of rectilinear and parallel second grooves (26), whose number is equal to the number of rows of gears, obtained on the guide member (16) and spaced from one another in the direction parallel to the first axis (A) by the predetermined amount (D) and a stop member (28) extending transverse to the guide member (16) and adapted selectively to engage in a releasable manner these second grooves (26) in order to define the respective axial selection positions of the row of gears of the control member (3).

5. A device as claimed in claim 4, characterized in that the second grooves (26) are obtained on a second surface (27) of the guide member (16) opposite the first surface (19).

6. A device as claimed in claim 5, characterized in that the second grooves (26) have the same angular extension as the cams (17), are angularly aligned with these cams (17) with respect to the first axis (A) and are also each aligned, along a plane at right angles to the first axis (A), with at least one end section (20, 21) of a relative cam (17).

7. A device as claimed in claim 6, characterized in that the stop member (28) extends coaxially to the tappet member (15) from the opposite side of the guide member (16) with respect to this tappet member (15).

8. A device as claimed in claim 1, characterized in that the selection maneuver is carried out by translation of the control member (3) along the first axis (A) and in that the engagement or disengagement maneuver is carried out by rotation of the control member (3) about the first axis (A).

9. A device as claimed in claim 8, characterized in that the actuator means (4) comprise an output member (5) moving along a second axis (B) at right angles to the first axis (A) and cooperating with the control member (3) in order to rotate it about the first axis (A) and to dispose it, for each row of gears, in the neutral and engagement positions.

10. A device as claimed in claim 8, characterized in that the guide member (16) is rigidly connected to the control member (3) and is formed by a cylindrical jacket portion coaxial to the first axis (A) and bearing the cams (17) stacked on one another in a direction parallel to the first axis (A) and in that the tappet member (15) is borne by the support structure (2) in an axially sliding manner along a third axis (C) transverse to the guide member (16) between a rest position in which the tappet member (15) is separated from the guide member (16) and an actuation position in which the tappet member (15) engages one of the cams (17).

11. A device as claimed in claim 10, characterized in that the third axis (C) is at right angles to the first and second axes (A, B).

12. A device as claimed in claim 10, characterized in that the guide member (16) is disposed facing the control member (3) and is secured in a projecting manner to an arm (18) extending radially with respect to the first axis (A) from the control member (3).

13. A device as claimed in claim 1, characterized in that the cams (17) are formed by respective first grooves extending angularly on a first surface (19) of the guide member (16).

14. A device as claimed in claim 13, characterized in that each of the cams (17) substantially has the shape of a broken line and comprises two rectilinear end angular sections (20, 21) acting as axial stop means for the control member (3), associated with adjacent engagement positions of adjacent rows, and extending on respective planes at right angles to the first axis (A) and spaced from one another by a predetermined amount (D) and an intermediate oblique angular section (22) connected on either side to the respective end sections (20, 21) and shaped such as to cause, when engaged by the tappet member (15), an axial displacement of the control member (3) by the predetermined amount (D) in association with a predetermined angular displacement of this control member (3).

15. A device as claimed in claim 14, characterized in that the cams (17) have identical profiles, are spaced from one another in a direction parallel to the first axis (A) by the predetermined amount (D) and are angularly aligned with one another with respect to this first axis (A).

* * * * *